United States Patent
Phan et al.

(10) Patent No.: US 11,280,154 B2
(45) Date of Patent: Mar. 22, 2022

(54) SEALING ASSEMBLY

(71) Applicant: Halliburton Energy Services, Inc., Houston, TX (US)

(72) Inventors: Anthony Phan, Lewisville, TX (US); Jack Gamill Clemens, Fairview, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 282 days.

(21) Appl. No.: 16/496,980

(22) PCT Filed: Dec. 13, 2018

(86) PCT No.: PCT/US2018/065430
§ 371 (c)(1),
(2) Date: Sep. 24, 2019

(87) PCT Pub. No.: WO2020/122919
PCT Pub. Date: Jun. 18, 2020

(65) Prior Publication Data
US 2021/0332660 A1 Oct. 28, 2021

(51) Int. Cl.
*E21B 33/12* (2006.01)
*E21B 33/128* (2006.01)
(Continued)

(52) U.S. Cl.
CPC ........ *E21B 33/128* (2013.01); *E21B 33/1208* (2013.01); *E21B 33/134* (2013.01); *F16J 15/34* (2013.01)

(58) Field of Classification Search
CPC .... E21B 23/06; E21B 33/124; E21B 33/1291; E21B 43/105; E21B 43/14; E21B 33/12;
(Continued)

(56) References Cited

U.S. PATENT DOCUMENTS 3,306,362 A * 2/1967 Urbanosky ......... E21B 33/1204
277/339
4,379,558 A 4/1983 Pippert
(Continued)

FOREIGN PATENT DOCUMENTS

WO WO-2017123198 A1 * 7/2017 ............ E21B 33/128
WO WO-2017196341 A1 * 11/2017 ............. E21B 23/06
WO WO-2020122919 A1 * 6/2020 ............. E21B 43/12

OTHER PUBLICATIONS

International Application No. PCT/US2018/065430, "International Search Report and Written Opinion", dated Aug. 27, 2019, 10 pages.

*Primary Examiner* — Daniel P Stephenson
(74) *Attorney, Agent, or Firm* — Kilpatrick Townsend & Stockton LLP (57) ABSTRACT

A sealing assembly for use downhole may include a plug having a first end and a second end opposite the first end. The plug may have an expandable sealing member positioned between the first end and the second end of the plug. The expandable sealing member having a run-in-hole diameter and an expanded diameter that is greater than the run-in-hole diameter. A support device may extending at least partially between a first end of the plug and the expandable sealing member. The support device may include a recess. An elastomeric material may be positioned at least partially within the recess of the support device. A cover may be positioned at least partially over the support device for reducing extrusion of the elastomeric material from within the recess of the support device in the expanded diameter.

20 Claims, 7 Drawing Sheets

(51) Int. Cl.
*E21B 33/134* (2006.01)
*F16J 15/34* (2006.01)

(58) Field of Classification Search
CPC .. E21B 33/128; E21B 33/1208; E21B 33/134; F16J 15/34
See application file for complete search history.

(56) References Cited

U.S. PATENT DOCUMENTS

| | | | |
|---|---|---|---|
| 4,509,763 A | 4/1985 | Fischer | |
| 4,880,217 A | 11/1989 | Navarro, Sr. et al. | |
| 6,796,376 B2* | 9/2004 | Frazier | E21B 33/129 |
| 7,168,494 B2* | 1/2007 | Starr | E21B 33/12 |
| | | | 166/192 |
| 8,641,113 B1* | 2/2014 | Russell | E21B 31/00 |
| | | | 294/86.1 |
| 10,619,446 B2* | 4/2020 | Webster | E21B 33/1293 |
| 2010/0038074 A1 | 2/2010 | Patel et al. | |
| 2011/0024134 A1* | 2/2011 | Buckner | E21B 33/1204 |
| | | | 166/382 |
| 2011/0101615 A1 | 5/2011 | Clarke | |
| 2012/0055667 A1* | 3/2012 | Ingram | E21B 33/134 |
| | | | 166/65.1 |
| 2013/0186646 A1* | 7/2013 | Xu | E21B 33/129 |
| | | | 166/382 |
| 2014/0311752 A1* | 10/2014 | Streich | E21B 33/1204 |
| | | | 166/376 |
| 2015/0047907 A1* | 2/2015 | Buytaert | E21B 17/1028 |
| | | | 175/57 |
| 2015/0129242 A1 | 5/2015 | Farquhar | |
| 2017/0260825 A1* | 9/2017 | Schmidt | E21B 33/129 |
| 2017/0342797 A1* | 11/2017 | Murphree | E21B 33/1208 |
| 2017/0350211 A1 | 12/2017 | Ingram et al. | |
| 2017/0370174 A1* | 12/2017 | Yun | C08K 3/04 |
| 2018/0195363 A1* | 7/2018 | Hofstee | E21B 33/1208 |
| 2018/0209241 A1 | 7/2018 | Farquhar et al. | |
| 2021/0054704 A1* | 2/2021 | Merron | E21B 33/1291 |
| 2021/0054719 A1* | 2/2021 | Nichols | E21B 34/12 |
| 2021/0156221 A1* | 5/2021 | Phan | E21B 33/128 |

* cited by examiner

SEALING ASSEMBLY

TECHNICAL FIELD

The present disclosure relates generally to devices for use in a wellbore in a subterranean formation and, more particularly (although not necessarily exclusively), to sealing assemblies positionable downhole in the wellbore.

BACKGROUND

Various devices can be utilized in a well traversing a hydrocarbon-bearing subterranean formation. For example, a sealing assembly such as a bridge plug may be installed or set along tubing string in the well. The sealing assembly may include a plug having an expandable region that comprises an elastomeric material. The plug may also include a support device or mechanical retention device positioned proximate to the expandable region. The elastomeric material may extend into recesses or openings in the support device. A force, for example a pressure, may be applied to the sealing assembly that forces the expandable region to deform and expand. Expansion of the expandable region may increase the diameter of the sealing assembly and may restrict the flow of fluid through an annulus between the sealing assembly and the tubing.

DETAILED DESCRIPTION

Certain aspects and features of the present disclosure relate to a downhole tool including a sealing assembly, for example but not limited to a bridge plug. The sealing assembly may include an expandable region that contacts an inner surface of the tubing string for creating a seal when the sealing assembly is set (or expanded). In the set position the expandable region of the sealing assembly may have an outer diameter that is greater than the original outer diameter of the sealing assembly prior to expansion (i.e. in the run-in-hole position). The sealing assembly may also include a support device adjacent the expandable region. An elastomeric material may be positioned over the support device and may extend into recesses or openings in the support device. The sealing assembly may also include a cover that may be positioned over the support device.

Downhole in the expanded position the sealing assembly may be exposed to high pressure and high temperatures. This extreme environment can cause the elastomeric material present in the sealing assembly to soften and flow. The elastomeric material may soften and seek to flow through the support device. In some aspects, the elastomeric material that extends within the recesses of the support device may soften and seek to flow out of the recesses and away from the support device. The flow of the elastomeric material through the support device (e.g. through recesses or spaces within the support device) may weaken a seal between the sealing assembly and the inner surface of the tubing string. The cover positioned over the support device may reduce the flow of elastomeric material through the support device. In other words, the cover may prevent or reduce a flow of elastomeric material through the cover and therefore block or reduce the flow of elastomeric material through the support device. The reduction or prevention of a flow of elastomeric material through the cover and thereby through the support device may reduce or prevent failure of the seal of the seal assembly within the tubing string.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
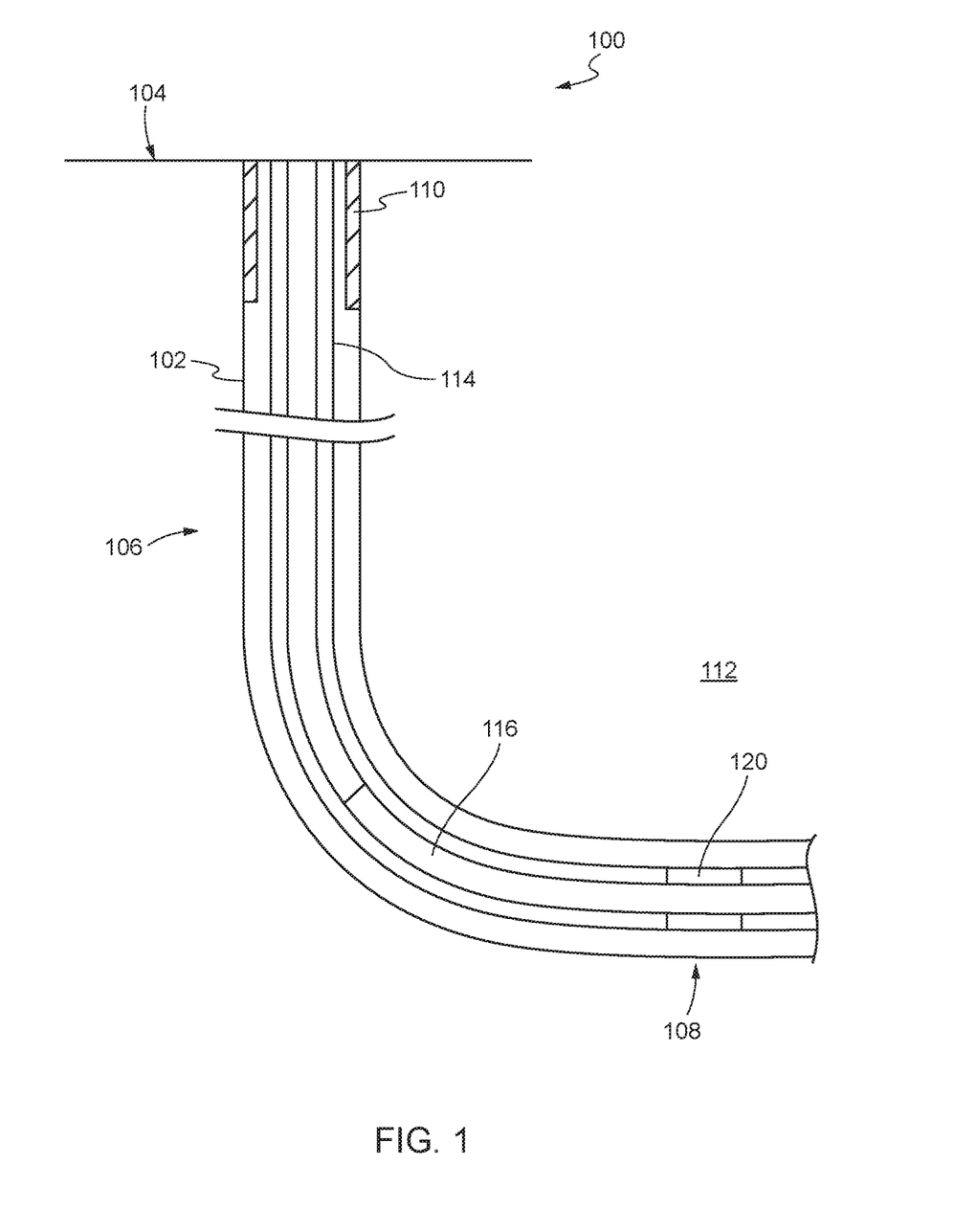
FIG. 1 is a cross-sectional view of a well system with a sealing assembly positioned downhole, according to one aspect.

FIG. 1 depicts by cross-section an example of a well system 100 that includes a bore that is a wellbore 102 extending through a surface 104 and various earth strata. The wellbore 102 has a substantially vertical section 106 and a substantially horizontal section 108. The substantially vertical section 106 and the substantially horizontal section 108 may include a casing string 110 cemented at an upper portion of the substantially vertical section 106. The substantially horizontal section 108 extends through a hydrocarbon bearing subterranean formation 112. A tubing string 114 within wellbore 102 extends from the surface 104 to the subterranean formation 112.

A sealing assembly, for example a plug assembly 116, can be deployed in the wellbore 102. In some aspects, the plug assembly 116 may be a bridge plug, though any suitable sealing assemblies may be used. The plug assembly 116 includes a plug 120 that may be expanded from a run-in-hole position to a set position. The plug assembly 116 may be set within the tubing string 114 to isolate a portion of the wellbore 102 below the plug assembly 116 from a portion of the wellbore 102 above plug assembly 116. The plug assembly may be set by a tool assembly, for example by applying a pressure to the plug assembly that forces the plug 120 of the plug assembly 116 to expand. Although FIG. 1 depicts the plug assembly 116 in the substantially horizontal section 108, the plug assembly 116 can be located, additionally or alternatively, in the substantially vertical section 106. The plug assembly 116 may also be deployed in open-hole environments or in cased wells.

Figure 2:
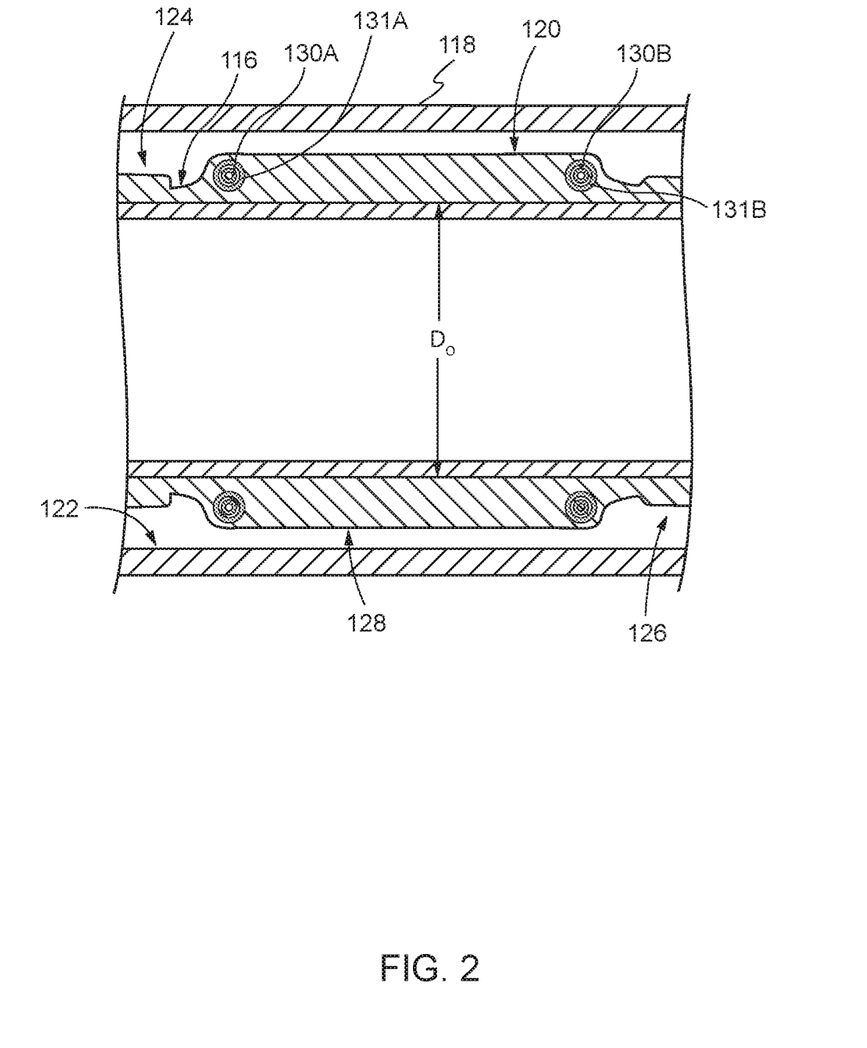
FIG. 2 is a cross-sectional side view of a seal assembly in a run-in-hole position, according to one aspect.

FIG. 2 is a cross-sectional side view of a sealing assembly, for example the plug assembly 116 within a tubing string 118. The plug assembly 116 may include a plug 120. The plug assembly 116 is shown in FIG. 2 in a run-in-hole position. As shown in FIG. 2, in the run-in-hole position the plug 120 has a diameter $D_o$ and the plug 120 does not contact an inner surface 122 of the tubing string 118. The plug 120 may have a first end 124 and a second end 126. The plug 120 may include an expandable region 128 positioned between the first end 124 and the second end 126 of the plug 120. The expandable region 128 may comprise an elastomeric material. The plug 120 may also include a support device 130A, for example but not limited to a coiled spring, positioned between the first end 124 of the plug 120 and the expandable region 128. In some aspects, the support device 130A may be positioned just beyond the expandable region 128 of the plug 120. In some aspects, for example as shown in FIG. 2, the plug 120 may include a second support device 130B positioned between the second end 126 of the plug 120 and the expandable region 128.

A cover 131A may be positioned over the support device 130A. While in FIG. 3 the cover 131A is shown positioned over the support device 130A, in some aspects the cover may be positioned in an inner region of the support device 130A (e.g. within an inner region of a coiled spring). In some aspects, the cover 131A may comprise a sleeve that encircles the support device 130A along a length of the support device 130A. In some aspects, the cover 131A may comprise a layer of material that is positioned at least partially over the support device 130A but may not fully encircle the support device. The cover 131A may extend along some or all of the length of the support device 130A. The cover 131A may comprise a composite material or a metallic material. For example, the cover 131A may include fiberglass, Kevlar, carbon fiber, stainless steel, brass or any other suitable material for use downhole in a high temperature and/or high pressure environment. The cover 131A may comprise a woven material, a braided material, a material having uni-directional fibers, or any other suitable material. The second cover 131B may extend over the second support device 130B. The second cover 131B may comprise the same or different features of the cover 131A, for example the second cover 131B may comprise a different material or shape than the cover 131A.

Figure 3:
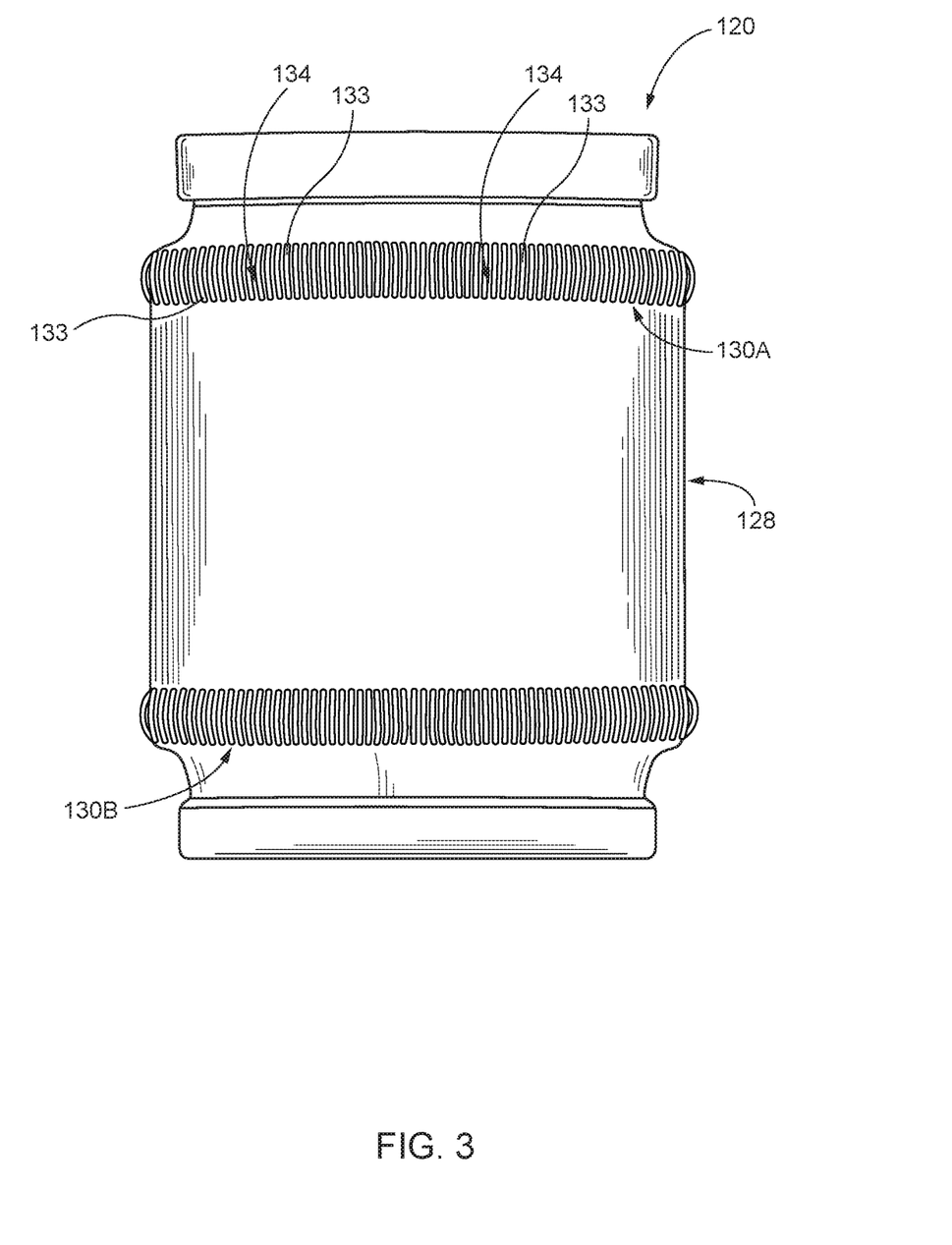
FIG. 3 is a side view of a plug of a seal assembly, according to one aspect.

FIG. 3 depicts a side view of a plug of a plug assembly, for example plug 120. In FIG. 3, the support devices 130A, 130B are shown as coiled springs though other devices may be used. The support device 130A shown in FIG. 3 includes recesses 134 between the coils 133 of the support device 130A. In some aspects, an elastomeric material may extend over the support device 130A and may extend into the recesses 134 of the support device 130A. No layer of elastomeric material is shown over the support device 130A in FIG. 3 so as to provide a clearer view of the support devices 130A, 130B of the plug 120. Though in FIG. 3 the second support device 130B is shown also as a coiled spring, in some aspects, the second support device 130B may comprise a different device or structure than the support device 130A.

Figure 4:
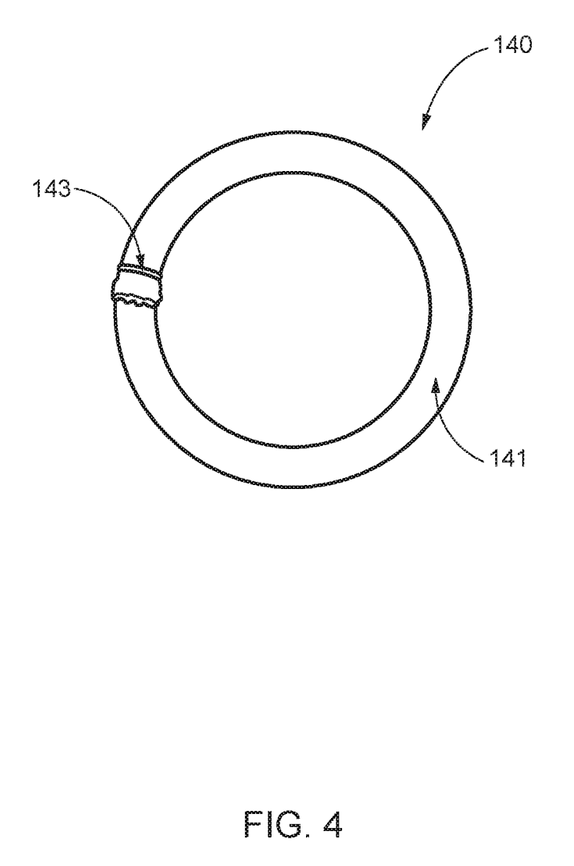
FIG. 4 is a top view of a cover, according to one aspect.

FIG. 4 depicts a cover 140 according to some aspects of the present disclosure. The cover 140 may include a material 141. The material 141 may be a woven material, for example but not limited to a woven stainless steel material, a woven carbon fiber material, or other suitable woven materials. The material 141 may be secured at a point 143 by mechanical fixation, for example but not limited to via glue, epoxy, string, wire, or other suitable means. The cover 140 may encircle a support device, though the support device is not visible in FIG. 4. In some aspects, the cover 140 may be positioned within an inner region of a support device, for example making the support device impenetrable to fluids or flow of a semi-fluid material. In some aspects, one or more of the covers 131A, 131B may include the features of the cover 140. In some aspects, the cover may comprise different features and may extend along a different portion of the plug as described further below with respect to FIGS. 6 and 7. The cover may include materials include metallic (e.g., copper, brass, and stainless steel) or non-metallic materials (e.g., carbon fiber, Kevlar, Polytetrafluoroethylene (PTFE), and fiberglass). In some aspects, the cover may be a material that is positioned only partially over the support device, for example positioned over a portion of an outer surface or a portion of an inner surface of the support device. The cover may not extend circumferentially around the entire surface of the support device but may only extend around a portion of the support device. The cover may extend only along a portion of the length of the support device. Similarly, in some aspects, the cover may only extend along a portion of a height of the support device.

Figure 5:
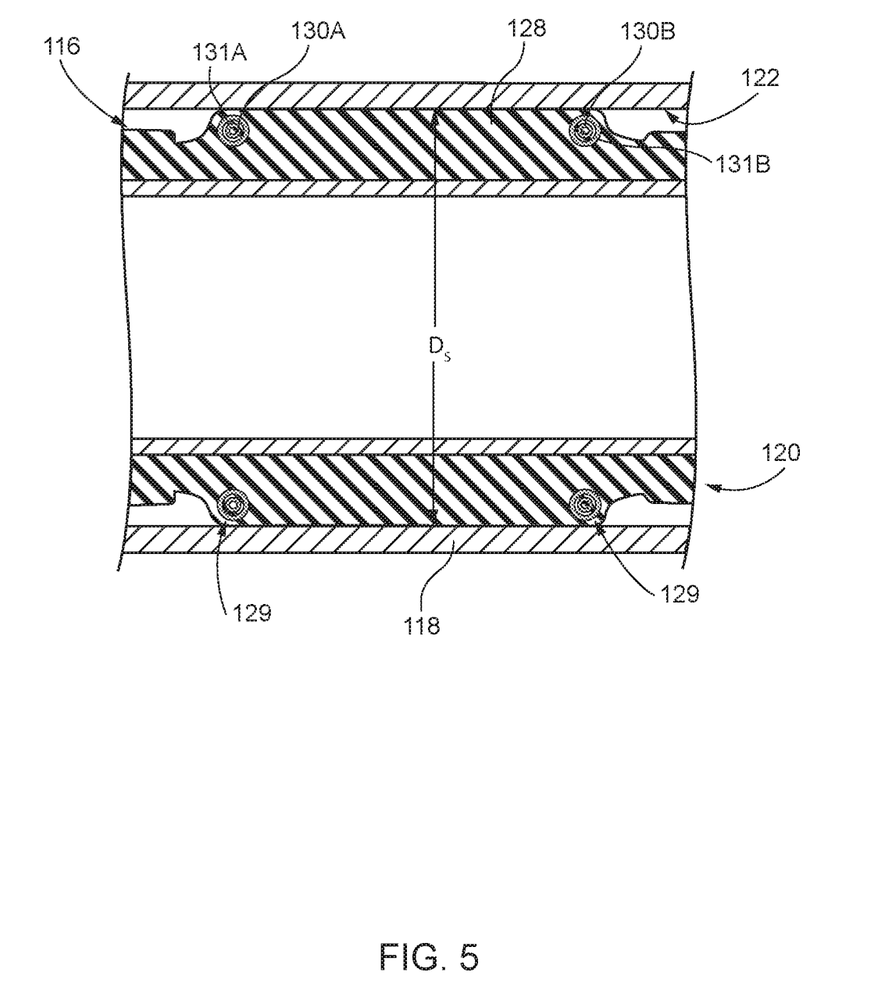
FIG. 5 is a cross-sectional side view of the plug of FIG. 2 in an expanded position, according to one aspect.

FIG. 5 is a cross-sectional side view of the plug assembly 116 of FIG. 2 in a set (or expanded) position in which the plug 120 is expanded. The plug 120 of the plug assembly 116 may be set by a downhole tool applying a force to the plug assembly 116. The force may be a pressure or a compressive force. The force may compress the plug assembly 116 and may force the plug 120 to compress and expand to a set position. The plug 120 has a diameter of $D_s$ in the set position. In the set position, the expandable region 128 of the plug 120 contacts and is sealed against the inner surface 122 of the tubing string 118. The support devices 130A, 130B (e.g., coiled springs or other suitable support devices) may in some aspects contact and seal against the inner surface 122 of the tubing string 118. The plug 120 may also include an elastomeric material 129 that may extend over the support devices 130A, 1306, as shown in FIG. 5. In some aspects, the elastomeric material 129 may seal against the inner surface 122 of the tubing sting 118 when the plug 120 is in the set position. The plug 120 may remain in the set position for a desired period of time.

Downhole in the set position the plug 120 may be exposed to high temperatures and/or high pressures. This extreme downhole environment may cause the elastomeric material of the plug 120 (e.g., the elastomeric material 129 and the elastomeric material of the expandable region 128) to soften and attempt to flow or extrude through the support device 130A. For example, the elastomeric material 129 that extends over support device 130A, may soften. Without the presence of the cover 131A, the elastomeric material 129 may extrude through the support device 130A, for example but not limited through recesses or openings in a support device including a coiled spring (e.g. support device 130A). In some aspects, the material of the expandable region 128 may also soften and seek to extrude through the support device 130A (e.g. away from the expandable region 128). The extrusion of elastomeric material of the plug 120 through the support device 130A may weaken the seal of the plug 120 in the tubing string 118. The cover 131A can reduce or prevent the extrusion of elastomeric material of the plug 120 through the support device 130A when the plug 120 is exposed to high temperatures and/or high pressures downhole. In other words, the elastomeric material 129 may not extrude through the support device 130A due to the presence of the cover 131A. For ease of description, various features and options of the present disclosure are discussed with respect to the support device 130A and cover 131A. In some aspects, the second support device 130B and second cover 131B may include the same or different features as the support device 130A and the cover 131A.

Figure 6:
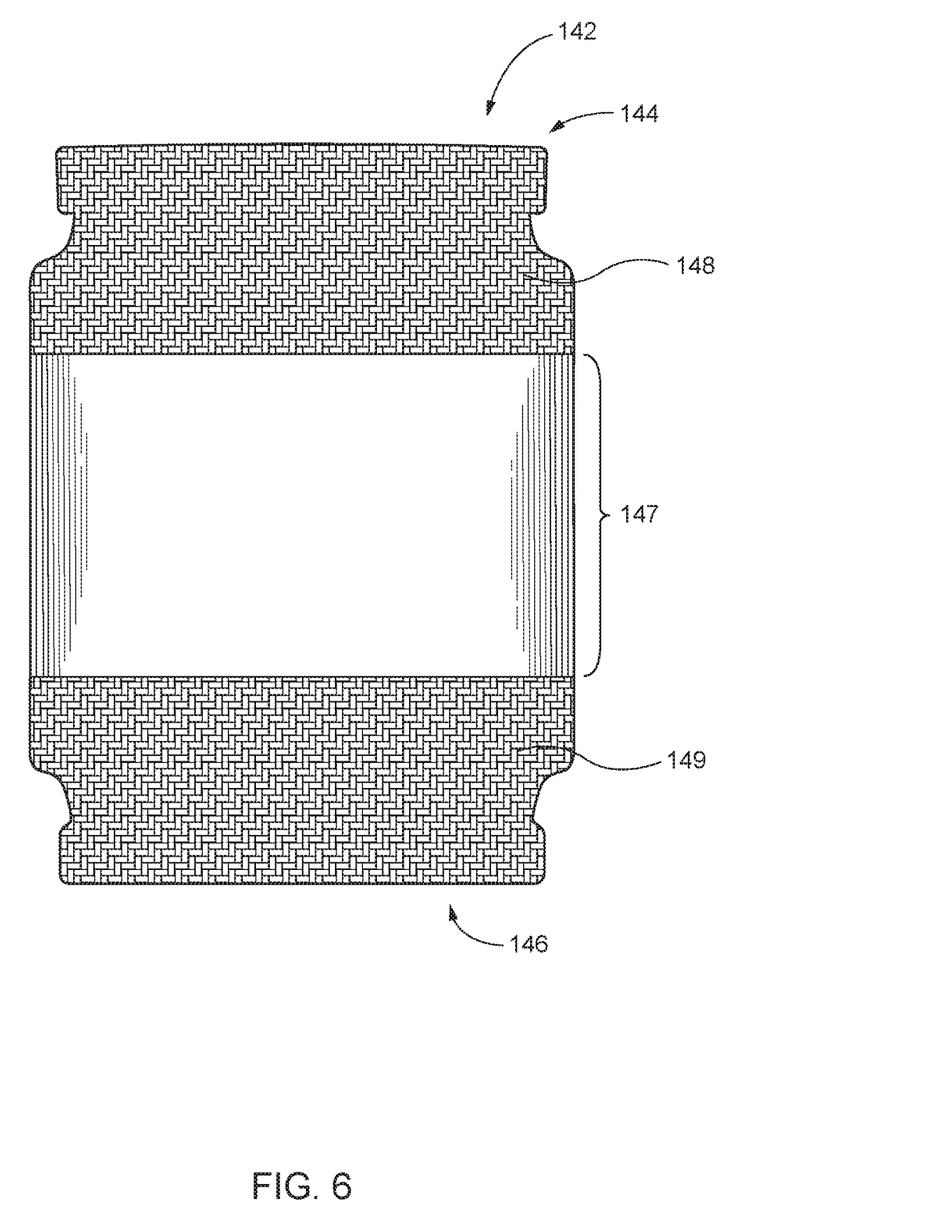
FIG. 6 is a side view of a plug of a seal assembly, according to one aspect.

In some aspects, a cover may extend over other parts of a plug of a plug assembly. For example, the cover may extend beyond the support device to an end of the plug adjacent the support device. FIG. 6 depicts a side view of a plug 142 having a first end 144 and a second end 146 opposite the first end 144, according to some aspects of the present disclosure. The plug 142 includes an expandable region 147 positioned between the first end 144 and the second end 146 of the plug 142. A cover 148 may be positioned over at least part of the plug 142. The cover 148 may extend over the first end 144 of the plug 142 and over a support device (not visible in FIG. 6 as it would be beneath the cover 148) positioned between the first end 144 and the expandable region 147. The cover 148 may comprise a woven material, the material may be metallic or non-metallic. In some aspects, a second cover 149 may be positioned over at least part of the plug 142. For example, the second cover 149 may extend between the second end 146 of the plug 142 and the expandable region 147 and may extend over a support device.

In some aspects, the cover 148 may define an outer surface of the plug 142, for example by being positioned over an elastomeric layer of the plug 142. In some aspects, the cover 148 may be positioned between the support device and an outer layer of an elastomeric material. While FIG. 6 depicts the cover 148 and the second cover 149 extending between the expandable region 147 and the respective ends 144, 146 of the plug 142, in some aspects the cover 148 may be positioned over only a portion of that region. In addition, while FIG. 6 depicts the covers 148, 149 comprising a woven material (e.g., a carbon fiber material, a Kevlar material, a stainless steel material, or any other suitable woven material) any other suitable material (woven or non-woven) may be used, including metallic materials (e.g., brass, steel, copper or other suitable metallic materials). In some aspects, the covers 148 and 149 may comprise the same or different materials.

Figure 7:
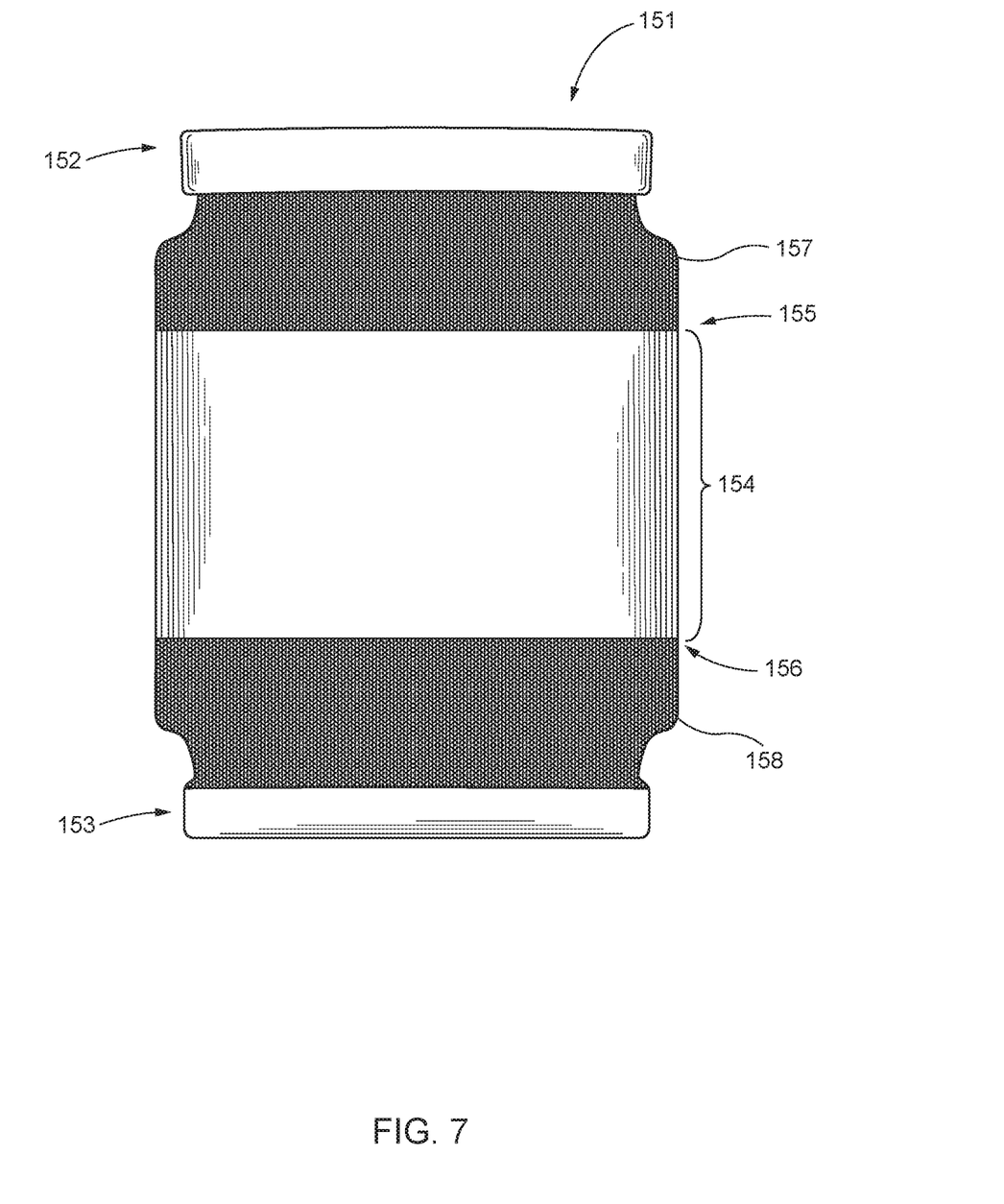
FIG. 7 is a side view of a plug of a seal assembly, according to another aspect.

FIG. 7 depicts a side view of a plug 151 having a first end 152 and a second end 153 opposite the first end 152. The plug 151 includes an expandable region 154 defined by edges 155 and 156. A cover 157 may be positioned along a portion of the region between an edge 155 of the expandable region 154 and the first end 152 of the plug 151. A second cover 158 may similarly be positioned along a portion of the region between the edge 156 of the expandable region 154 and the second end 153 of the plug 151. Each of the covers 157 and 158 may be positioned over a support device that is not visible in FIG. 7. The cover 157 may comprise a metal material, though in some aspects of the present disclosure the cover may comprise a composite material (e.g., PTFE, fiberglass, or other suitable materials). The second cover 158 may comprise the same or different material as the cover 157. Also, the second cover 158 may cover more or less of the plug 151 than the cover 157. In some aspects, one or more of the covers 157, 158 may cover more or less of the plug 151.

A plug that does not include a cover positioned over the support device following exposure to a high temperature and high pressure environment, may result in elastomeric material of the plug extruding through the support device away from an expandable region of the plug towards an end of the plug. This extrusion of the elastomeric material through a support device, such as a coiled spring can weaken or cause failure of the seal between the plug (without a cover) and the tubing string in which it is set. However, a plug that includes a cover positioned either over or within a support device may have less or no extrusion of the elastomeric material through the support device and may result in a stronger seal between the plug with the cover and the tubing string in which it is set. Thus, in some aspects of the present disclosure a plug that includes a cover, even after exposure to a high temperature and a high pressure environment during setting, may not result in elastomeric material of the plug being extruded through the support device or the cover. In some aspects, a plug without a cover over a support device may have a maximum sealing pressure of 7,500 PSI at 325 degrees Fahrenheit. In some aspects, plug with a cover may have a maximum sealing pressure of 12,500 PSI at 325 degrees Fahrenheit. Thus, the cover can aid in maintaining the integrity of the seal of the plug.

As used below, any reference to a series of examples is to be understood as a reference to each of those examples disjunctively (e.g., "Examples 1-4" is to be understood as "Examples 1, 2, 3, or 4").

Example 1 is a sealing assembly for use downhole comprising: a plug having a first end and a second end opposite the first end; an expandable sealing member positioned between the first end and the second end of the plug, the expandable sealing member having a run-in-hole diameter and an expanded diameter that is greater than the run-in-hole diameter; a support device positioned between extending at least partially between a first end of the plug and the expandable sealing member, the support device including a recess; an elastomeric material positioned at least partially within the recess of the support device; and a cover positioned at least partially over the support device for reducing extrusion of the elastomeric material from within the recess of the support device in the expanded diameter.

Example 2 is the sealing assembly of example 1, wherein the support device comprises a coiled spring.

Example 3 is the sealing assembly of examples 1-2, wherein the cover comprises at least one of a metallic material or a composite material.

Example 4 is the sealing assembly of example 3, wherein the composite material comprises at least one of Kevlar or carbon fiber.

Example 5 is the sealing assembly of example 3, wherein the metallic material comprises at least one of stainless steel, copper or brass.

Example 6 is the sealing assembly of examples 1-5, wherein the cover comprises a sleeve that encircles the support device along at least a length of the support device.

Example 7 is the sealing assembly of examples 1-6, wherein the cover at least partially covers the first end of the plug.

Example 8 is the sealing assembly of examples 1-7, wherein the elastomeric material is positioned between the support device and the cover.

Example 9 is a plug assembly for use downhole comprising: a first end and a second end, the second end opposite the first end; an expandable region positioned between the first end and the second end of the plug assembly, the expandable region having a run-in-hole diameter and an expanded diameter that is greater than the run-in-hole diameter; a support device positioned between the expandable region and the first end of the plug assembly; and a cover positioned at least partially over the support device.

Example 10 is the plug assembly of example 9, wherein the support device comprises a coiled spring.

Example 11 is the plug assembly of examples 9-10, wherein the cover comprises a sleeve that encircles the support device along at least a length of the support device.

Example 12 is the plug assembly of examples 9-11, wherein the sleeve comprises a metallic material for retaining the elastomeric material within the at least one recess of the support device when the expandable region is at the expanded diameter.

Example 13 is the plug assembly of examples 9-12, wherein the cover comprises a composite material.

Example 14 is the plug assembly of example 13, wherein the composite material comprises at least one of Kevlar, fiberglass, or carbon fiber.

Example 15 is the plug assembly of examples 9-13, wherein the cover comprises a woven material.

Example 16 is the plug assembly of example 15, wherein the woven material comprises a metallic material.

Example 17 is the plug assembly of example 9-16, further comprising an elastomeric material positioned within at least partially within the support device Example 18 is the plug assembly of example 17, wherein the expandable region comprises an elastomeric material.

Example 19. The plug assembly of examples 9-18, further comprising: an additional support device positioned between the expandable region and the second end of the plug assembly; and an additional cover positioned at least partially over the additional support device.

Example 20 is the plug assembly of example 19, wherein the additional cover comprises a metallic material.

The foregoing description of certain aspects, including illustrated aspects, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A sealing assembly for use downhole comprising:
a plug having a first end and a second end opposite the first end;
an expandable sealing member positioned between the first end and the second end of the plug, the expandable sealing member having a run-in-hole diameter and an expanded diameter that is greater than the run-in-hole diameter;
a support device positioned between extending at least partially between a first end of the plug and the expandable sealing member, the support device including a recess;
an elastomeric material positioned at least partially within the recess of the support device and extending at least partially over the support device; and
a cover positioned at least partially over the support device for reducing extrusion of the elastomeric material from within the recess of the support device in the expanded diameter.

2. The sealing assembly of claim 1, wherein the support device comprises a coiled spring.

3. The sealing assembly of claim 1, wherein the cover comprises at least one of a metallic material or a composite material.

4. The sealing assembly of claim 3, wherein the composite material includes at least one of Kevlar or carbon fiber.

5. The sealing assembly of claim 3, wherein the metallic material comprises at least one of stainless steel, copper, or brass.

6. The sealing assembly of claim 1, wherein the cover comprises a sleeve that encircles the support device along at least a length of the support device.

7. The sealing assembly of claim 1, wherein the cover at least partially covers the first end of the plug so as to define an outer surface of the plug.

8. The sealing assembly of claim 1, wherein the elastomeric material is positioned between the support device and the cover.

9. A plug assembly for use downhole comprising:
a first end and a second end, the second end opposite the first end;
an expandable region positioned between the first end and the second end of the plug assembly, the expandable region having a run-in-hole diameter and an expanded diameter that is greater than the run-in-hole diameter;
a support device positioned between the expandable region and the first end of the plug assembly;
an elastomeric material positioned at least partially within the support device and extending at least partially over the support device; and
a cover positioned at least partially over the support device.

10. The plug assembly of claim 9, wherein the support device comprises a coiled spring.

11. The plug assembly of claim 9, wherein the cover comprises a sleeve that encircles the support device along at least a length of the support device.

12. The plug assembly of claim 11, wherein the support device further comprises at least one recess, and wherein the sleeve further comprises a metallic material for retaining the elastomeric material within the at least one recess of the support device when the expandable region is at the expanded diameter.

13. The plug assembly of claim 9, wherein the cover comprises a composite material.

14. The plug assembly of claim 13, wherein the composite material comprises at least one of Kevlar, fiberglass, or carbon fiber.

15. The plug assembly of claim 9, wherein the cover comprises a woven material.

16. The plug assembly of claim 15, wherein the woven material comprises a metallic material.

17. The plug assembly of claim 9, wherein the expandable region comprises an elastomeric material.

18. The plug assembly of claim 9, further comprising:
an additional support device positioned between the expandable region and the second end of the plug assembly; and
an additional cover positioned at least partially over the additional support device.

19. The plug assembly of claim 18, wherein the additional cover comprises a metallic material.

20. The plug assembly of claim 9, wherein the cover at least partially covers the support device and a first end of the plug assembly so as to define an outer surface of the plug assembly.

* * * * *